United States Patent [19]

Zemanek, Jr.

[11] 4,413,512
[45] Nov. 8, 1983

[54] METHOD OF LOCATING POTENTIAL LOW WATER CUT HYDROCARBON RESERVOIRS

[75] Inventor: Joseph Zemanek, Jr., Dallas, Tex.

[73] Assignee: Mobil Oil Corporation, New York, N.Y.

[21] Appl. No.: 336,743

[22] Filed: Jan. 4, 1982

[51] Int. Cl.$^3$ .............................. E21B 49/00
[52] U.S. Cl. ........................................ 73/152
[58] Field of Search ........................... 73/152

[56] References Cited

U.S. PATENT DOCUMENTS 3,508,438  4/1970  Alger et al. .................. 73/152

OTHER PUBLICATIONS

An Improved Nuclear Magnetism Logging System and Its Application to Formation Evaluation, Herrick et al., Sep. 1979.
A New Approach for Low-Resistivity Sand Log Analysis, Murphy et al., Nov. 1972, Journal of Petroleum Technology, pp. 1302-1306.
An Investigation of Permeability, Porosity & Residual Water Saturation Relationships for Sandstone Reservoirs, A. Timur, Jul.-Aug. 1968, The Log Analyst, pp. 8-17.
Smackover Reservoir: Interpretation Case Study of Water Saturation Versus Production, Guillotte, et al., Transactions-Gulf Coast Association of Geological Societies, vol. XXIX, 1979, pp. 121-126.
A Method of Determining Permeability by Means of a Pulsed NMR and an Application of the Method to the Study of a Gulf Coast Supernormally Pressured Well, Seevers, Society of Petroleum Engineers of Aime, 1972, Paper #SPE 3847.
Surprising Productivity from Low-Resistivity Sands, Vajnar et al., SPWLA Eighteenth Annual Logging Symposium, Jun. 5-8, 1977.
The Use of Core Analysis Data to Explain the Abnormally Low Resistivities of Some Hydrocarbon-Productive Simpson Series Sands in Central Oklahoma, Gauntt, et al., Core Laboratories, Inc. SPWLA 4th Annual Logging Symposium Transactions May 23-24, 1963.
Electric Log Detection of Diagenetically Altered Reservoirs and Diagenetic Traps, Almon, et al., Transactions-Gulf Coast Association of Geological Societies, vol. XXIX, 1979, pp. 1-10.

Primary Examiner—Howard A. Birmiel
Attorney, Agent, or Firm—A. J. McKillop; M. G. Gilman; J. F. Powers, Jr.

[57] ABSTRACT

A method of identifying potential low water cut hydrocarbon producing zones of a formation having significant water saturation (i.e. about 50% or more of the available pore space). The formation is logged to determine its water saturation. The formation rock is sampled at a level at which the log-indicated water saturation is significant. Sample rock is cleaned of hydrocarbons and saturated with brine. The spin-lattice relaxation time of hydrogen nuclei of the water molecules of the wetted sample is determined using nuclear magnetic resonance techniques and is used to determine the surface area of the sampled rock. An irreducible water saturation of the sampled formation rock is determined from the measured surface area and is plotted with the log-indicated formation water saturation at or at and about the level from which the rock sample was obtained. Levels where the irreducible water saturation approximate or exceed the log-indicated formation water saturation are zones from which hydrocarbons potentially may be recovered without significant attendant water production.

9 Claims, 4 Drawing Figures

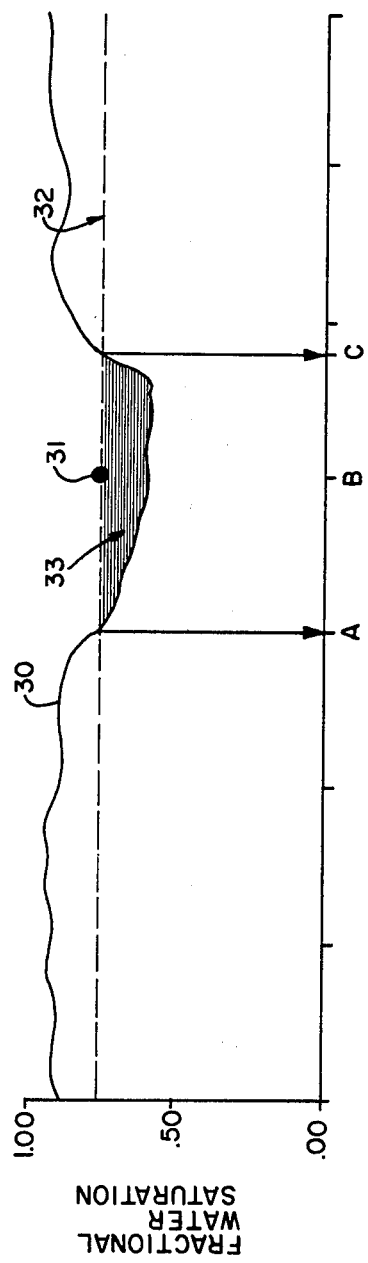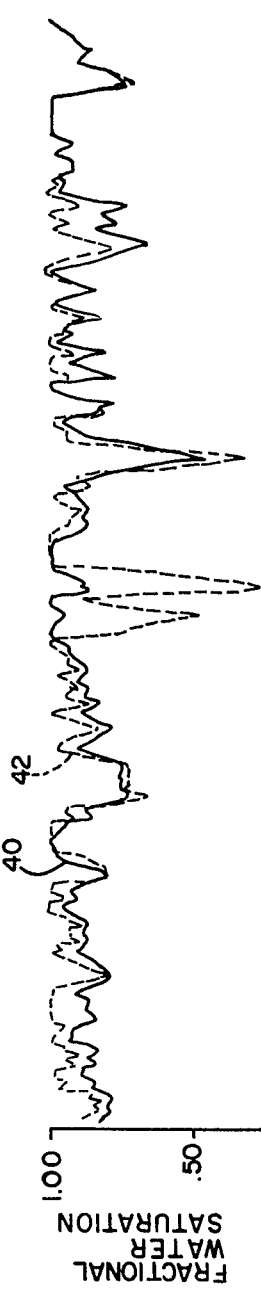

METHOD OF LOCATING POTENTIAL LOW WATER CUT HYDROCARBON RESERVOIRS

BACKGROUND OF THE INVENTION

This invention relates to the area of oil and natural gas exploration and, more particularly, to a method for identifying zones of geological formations having significant water saturations in which the water is essentially or entirely bound or immobile and from which any hydrocarbons present may be recovered without significant attendant water.

Subsurface reservoirs of natural gas and/or petroleum, hereinafter referred to generically as "hydrocarbons" are typically found trapped in permeable geological strata beneath a layer of impermeable strata material. A hydrocarbon will "float" upon any ground water present although typically, a transition zone will exist between the two fluids due to the water being raised by capillary action of the permeable strata material. In some regions, impermeable layers may be relatively closely stacked atop one another trapping thin zones of what may be essentially hydrocarbons, essentially water or mixed hydrocarbons and water. A well bore dropped through the formation and various layers may produce water if tapped in a transition region or mixed hydrocarbon and water zone. The cost of transporting, separating and disposing of the attendant water adds sufficiently to production costs that hydrocarbon reservoirs have often been left untapped where it is expected or believed they would produce excessive amount of attendant water.

The determination of the location and amount of ground water present at various levels of a formation is typically based upon the interpretation of conventional electrical (i.e., a resistivity) logs taken through a borehole dropped through the formation. Water saturation of the available pore space of the formation is determined from the resistivity log measurements using the Archie equation:

$$S_w^n = a \cdot R_w / \phi^m \cdot R_t \qquad (1)$$

where "$S_w$" is the water saturation as a fraction of the available pore space of the formation, "a" is a formation resistivity co-efficient, "$R_w$" is the formation water resistivity, "$\phi$" is the fractional formation porosity, "$R_t$" is the formation resistivity indicated by the resistivity log, "n" is the saturation exponent and "m" is the porosity or cementation exponent. The Archie equation may be expressed in other ways and there are numerous methods in the art for determining, measuring or otherwise obtaining the various components needed to predict water saturation $S_w$ from the log-indicated resistivity, $R_t$, using the equation in any of its forms.

It is widely recognized that a certain portion of the ground water remains essentially immovably bound to the formation rock because of capillary action and surface tension. This water is at various times also referred to as the "immobile", "residual" or "irreducible" water saturation of the formation and is expressed as a percentage of the pore space of the formation. However, lacking a tool by which to determine the extent to which the log indicated water was immovably bound or free and based upon the long term experience, it has been common practice in the oil industry to leave untapped hydrocarbon reservoirs having significant resistivity log indicated water saturations (i.e. water saturations of about 50% or more of the formation pore space). However, hydrocarbons have been produced, on occasion, with little or no attendant water from so-called "low-resistivity" formations where conventional resistivity logs have indicated water saturations in excess of 50% and, at times, even in excess of 80% of the formation pore space. With the rising value of petroleum and natural gas, it is becoming increasingly important to be able to identify all potentially recoverable hydrocarbon reservoirs, including those located in the "low-resistivity" formations which have these significant immobile water saturations.

One method to determine immobile water saturations is to measure them, indirectly, by means of a Schlumberger nuclear magnetism logging tool or comparable logging device. As described by Herrick et al. in a paper entitled "An Improved Nuclear Magnetism Logging System and its Application to Formation Evaluation" presented at the 54th Annual Fall Technical Conference and Exhibition of the Society of Petroleum Engineers of AIME, Sept. 23–26, 1979, this device measures by nuclear magnetic resonance the bulk or movable hydrogen bearing molecules of the formation. A component of the Schlumberger device which is passed through a borehole into a formation creates a strong local magnetic field essentially perpendicular to the earth's magnetic field and polarizes nearby hydrogen nuclei. After allowing sufficient time for the hydrogen nuclei to equilibrate in the polarized state the local magnetic field is rapidly terminated. The polarized hydrogen nuclei precess under the influence of the earth's magnetic field generating a characteristic signal decaying with time known as a free induction decay ("FID") signal. The decay time of the FID signal varies with the state of the molecules having the hydrogen nucleus or nuclei. The decay times of solid materials are shorter than those of bound fluids which themselves are shorter than free or bulk fluids. The free induction decay signal detected in situ by the nuclear magnetic log ("NML") is in reality a multiplicity of signals generated by the various minerals and fluids having hydrogen nuclei, some of the fluids being bound by varying degrees of surface tension and capillary action. From these measurements the NML determines the amount of free fluid ("Free Fluid Index" or "free fluid porosity") in a geological formation, the remainder of the pores space being assumed to be occupied by bound fluid. An arbitrary cut-off time is used in the NML to distinguish between (i.e. bulk free) hydrogen containing fluids and other sources of hydrogen producing an FID signal. Thus the NML does not measure bound water or oil. Moreover it cannot distinguish between water and certain types of light hydrocarbons. It further requires conditioning of the borehole mud column with a magnetite slurry before logging can be undertaken to prevent interference of the borehole fluid with the measuring process, an added expense and significantly more expensive and time consuming if not performed before circulation of the borehole mud is stopped. It would be desirable to provide other methods of determining irreducible water saturations using tools and methods more typically applied when drilling and investigating boreholes.

Many researchers in the field believe that irreducible water saturation is related in some way to other, measurable characteristics of the formation rocks. For example, some have noted an apparent correlation between formation rock surface areas and irreducible water saturations. See Murphy and Owens, "A New Approach for Low-Resistivity Sand Log Analysis", *JOUR. OF PETR. TECH.*, pp. 1302-1306, November, 1972. Murphy and Owns measured the surface areas of core samples obtained from a number of widely scattered North and South American sites using a nitrogen absorption method and the minimum interstitial water saturations by porous-disc capillary pressure method. By their measuring techniques, the irreducible water saturation-surface area relationships varied from site to site and thus they concluded could not be represented by a general relationship. They hypothesized that these differences arose under the influence of such secondary factors as the presence of varying amounts and types of clay, the presence of ashy materials and different pore geometries in the rock. They proposed that a surface area/irreducible water saturation relationship be determined from measurements of both characteristics in a number of core samples obtained from a given site and that the surface area, irreducible water saturation or both be further correlated to a so-called "shaliness factor" determined from the response of a gamma ray log, SP log, or density and velocity logs. Irreducible water saturations throughout the formation could thereafter be predicted for the formation from its log-indicated shaliness factor. Murphy and Owens further noted that these predicted irreducible water saturations could be compared with water saturations determined from the response of a resistivity log using the aforesaid Archie relationship. If the log-indicated water saturation had the same or nearly the same or was less than the value of the predicted, irreducible water saturation along an interval, that interval was identified as potential water-free or low water cut hydrocarbon productive zone. However, if the irreducible water saturations were distinctly different and the log-indicated values exceeded the predicted irreducible values, the zone was identified as water productive. Timur, in an earlier article entitled, "An Investigation of Permeability Porosity, & Residual Water Saturation Relationships for Sandstone Reservoirs", *THE LOG ANALYST*, pp. 8-17 (July-August, 1968), also notes in a discussion of the relationship among irreducible water saturation, permeability and porosity, that others have previously assumed irreducible water saturations to be linearly related to the pore volume specific surface areas (i.e. surface area per unit volume of pore space) of the rock material. See also Guillotte et al, "Smackover Reservoir: Interpretation Case Study of Water Saturation Versus Production", *XXIX TRANS-NOW GULF COAST ASSOC. OF GEOL. SOC.*, pp. 121-126 (1969), for further discussion of the relationship among irreducible water saturation, porosity and permeability.

SUMMARY OF THE INVENTION

It is an object of the invention to provide an improved method of identifying potential low water cut hydrocarbon producing zones having significant log indicated water saturation.

It is yet another object of the invention to provide an improved method for predicting irreducible water saturations from formation rock surface area measurements which is of wide applicability.

The above and other objects are satisifed by the invention which is an improved method for identifying potential low water cut or water-free hydrocarbon producing zones having significant water saturations in a subsurface geological formation by measuring the surface area of sampled formation rock through nuclear magnetic resonance and determining irreducible water saturation from the measured surface area. In practicing the invention, the formation water saturation is determined. Typically this is accomplished by traversing a length of a borehole which has been drilled into the formation with an appropriate logging tool. Typically too, a logging tool which measures the formation resistivity is used and formation water saturation is determined from those measurements. It is recognized that other logging tools and methods other than logging may be used to determine the formation water saturation. The formation material is sampled at one or more levels where the indicated water saturation is deemed significant. While the magnitude of the water saturation which is significant may vary from area to area depending upon the lithologies involved and the practitioner's knowlege of those lithologies, typically water saturations of about 50% or more of the formation pore space are considered significant. The surface area of the sampled formation rock is measured by nuclear magnetic resonance techniques. Irreducible water saturation of the formation, determined from the measured surface area of a formation rock sample, is plotted with the log-indicated fractional water saturation at or about the level of the formation where the sample was obtained. Levels where the irreducible water saturation approximates or exceeds the formation water saturation and is less than one hundred percent identify zones where hydrocarbons, if present, may be recoverable with little or no attendent water production.

BRIEF DESCRIPTION OF THE DRAWINGS

The invention will be better understood with reference to the accompanying drawings in which:

FIG. 3 is a first envisioned display prepared using the subject invention; and

FIG. 4 is a second envisioned display prepared using the subject invention.

DETAILED DESCRIPTION OF THE INVENTION

Figure 1:
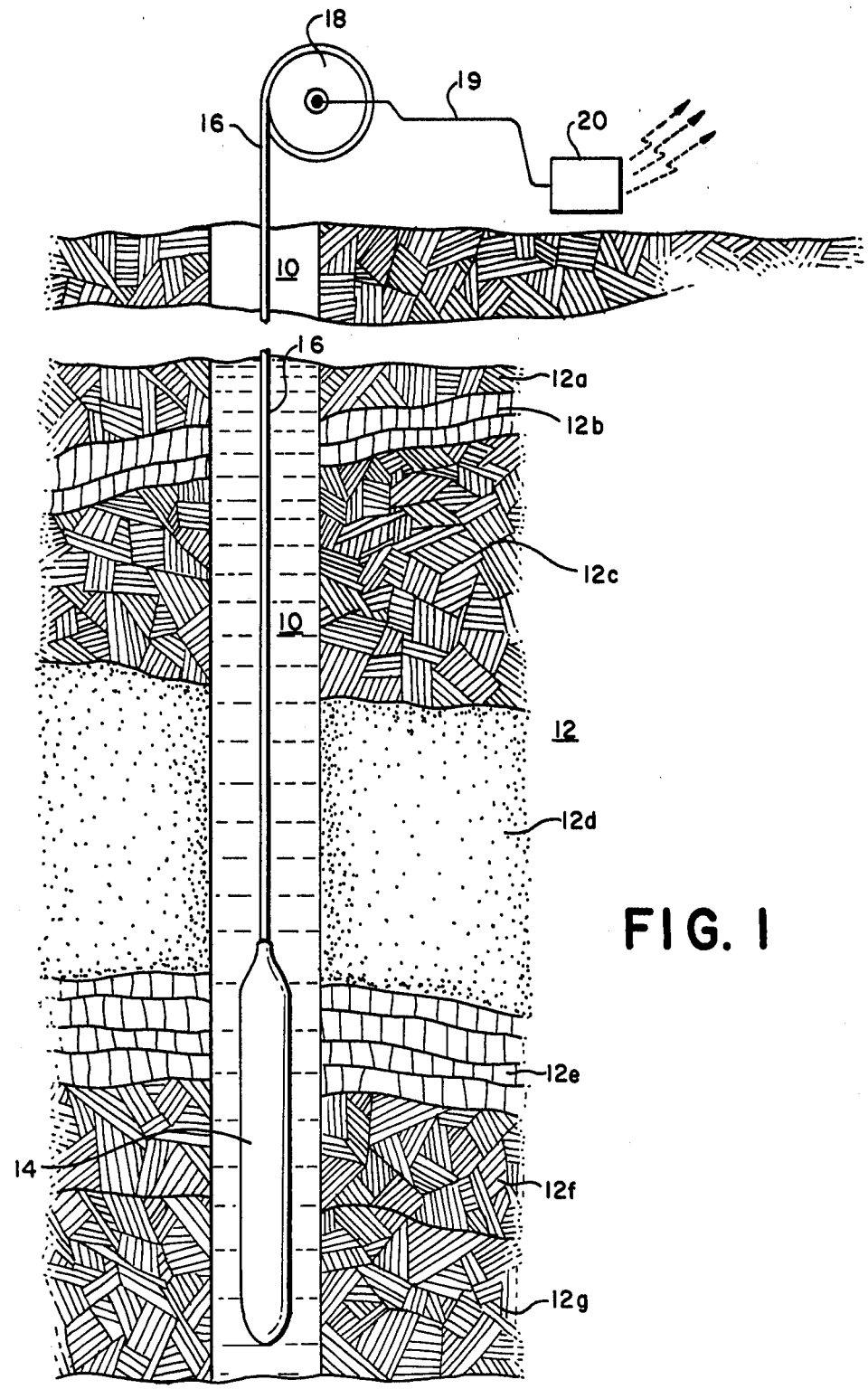
FIG. 1 depicts diagrammatically the logging of a subsurface geological formation.

FIG. 1 depicts a borehole 10 which has been drilled in a typical fashion into a subsurface geological formation 12 to be investigated for potential hydrocarbon producing reservoirs. A representative logging tool 14 has been lowered into the hole 10 by means of a cable 16 and appropriate surface equipment represented diagrammatically by a reel 18 and is being raised through the formation 12 comprising a plurality of layers 12a through 12g of differing composition, to log one or more of the formation's characteristics. Signals generated by the tool 14 are passed to the surface through the cable 16 and from the cable 16 through another line 19 to appropriate surface equipment 20 for processing, recording and/or display or for transmission to another site for processing, recording and/or display. Generally, standard log analysis will identify the hydrocarbon bearing zones. The problem is to be able to predict that little or no water will be produced even though log analysis indicates the formation has a water saturation of about 50% or more.

Porosity and water saturation values of the formation are both typically determined from log data gathered in this fashion as part of the standard log analysis process. Porosity may be determined from measurements obtained by a conventional density log or, if desired, from any of several other conventional logging tools including gamma ray, neutron and sonic, or from a combination of the measurements of such tools.

Water saturation is typically determined from formation resistivity log measurements taken with conventional logging equipment in the manner depicted in FIG. 1. Zones of significant water saturation may be identified directly from the resistivity log measurements by the skilled practitioner or water saturation of the formation may be determined in the conventional fashion from the resistivity log data using the Archie equation (1) identified in the BACKGROUND OF THE INVENTION section, above and examined. The practitioner identifies zones of the formation having significant water saturations, i.e. those zones having formation water saturation of about 50% or more, which typically heretofore have been left untapped. However, it is envisioned that term "significant" may encompass a lower formation water saturation value if the practitioner believes that for a particular formation, excessive water cut hydrocarbons may be produced at water saturations less than about 50%.

The practitioner may choose to eliminate certain zones of significant water saturation along the well bore from consideration for other factors such as low apparent permeability, total (100%) or extremely high indicated water saturation implying little or no hydrocarbons available for recovery, indications of substances other than hydrocarbons in the remaining formation pore space, etc. The practitioner may also decide to practice the invention by analyzing an entire formation or a portion of such formation at regular intervals encompassing zones of significant and insignificant water saturations. Once significant water saturation/potential hydrocarbon producing zones of the formation or the portion(s) of the formation desired to be analyzed (hereinafter referred to as the simply as the "zones") are identified, it is necessary to determine their irreducible water saturations.

One or more samples of the formation rock are gathered from each zone by any conventional technique. Coring the formation through the borehole may be necessary as a means to most accurately locate the samples obtained but drill bit cuttings and fragments may also be used, if available, as very little sample material is needed. Moreover, it may not be necessary to obtain samples from all zones or more than one sample from any zone if it is believed that the sample from one zone accurately represents the lithology of the entire zone and/or other zones under investigation.

Bulk volume specific surface area (i.e., the surface area per unit bulk volume of the formation rock), $A_{specific}$, from which the irreducible water saturation is determined in the manner hereinafter described, is itself determined by the relationship:

$$A_{specific} = Area_{NMR} \times Density \times (1 - Porosity) \qquad (2)$$

Density may be determined from appropriate log measurements or, more simply, estimated from standard reference tables by a practitioner with a knowledge of the lithology of the formation. It is expected that in most situations, density will have little if any variation through a particular formation so a constant value may be used. Porosity may be determined from measurements obtained by any of several aforementioned porosity indicating logging tools or, if such information is not available, measured directly from the rock sample(s). $Area_{NMR}$ is the surface area per unit mass of the rock sample measured by nuclear magnetic resonance ("NMR") techniques. Hydrogen nuclei of water in a sample of formation material are excited by one or more appropriate radio frequency pulses and upon subsequent relaxation, generate a free induction decay signal which can be measured. The decay rate of the FID signal will vary depending upon the state of the water molecules of the sample. Generally speaking, the more bound water molcules there are the faster the decay time of their characteristic signal. The FID signal detected from each formation sample will be a composite of individual signals having varying decay rates which are generated by water molecules unbound or bound by varying degrees to the other sample materials. A more extensive description of the theory and practice of nuclear magnetic resonance techniques may be found in *Pulse Fourier Transform NMR/Introduction to Theory and Methods*, T. Farrar and E. Becker, Academic Press, Inc. New York (1971), incorporated by reference.

The samples were measured by NMR techniques as follows. Samples were first cleaned of residual hydrocarbons using a suitable solvent such as toluene which was then allowed to evaporate from the sample. The cleaned samples were then dried overnight at a temperature of about 50° C. Sample rock of known weight (about 5 grams) was added to a container with brine having the same salinity as the formation water where the samples were obtained. The brine was added to the sample in measured increments until the sample appeared to be physically saturated (i.e., at or just before free water would drain from the sample). The sample was then inserted into a coil probe connected to radio frequency signal generation and detection circuit and the coil probe and sample inserted into a magnetic field of about 6000 gauss. As is explained in Farrar and Becker, a plurality of 180°, t, 90° pulse sequences were used to determine the spin-lattice relaxation time $T_1$ of the sample. After being allowed several seconds to equilibriate, each sample was irradiated with a first 25.14 megahertz radio frequency ("rf") pulse lasting about 10 microseconds which caused the hydrogen nuclei of the water molecules to rotate 180° from their equilibrium alignment with the original magnetic field. After a time t, the sample was then stimulated with a second pulse of the same frequency lasting only about 5 microseconds to rotate the hydrogen nuclei of the water molecules another 90°. The FID signal voltage $V_t$ induced in the coil by the sample was measured. The method was repeated several times for t values ranging between about 50 microseconds and several seconds, the sample being allowed to equilibrate in the magnetic field for 5–10 seconds between each series of rf pulses and FID signal voltage measurements. For a pure, homogenously bound sample material, $V_t$ is related to t by the relationship $$\frac{V_\infty - V_t}{2V_\infty} = e^{-t/T_1} \qquad (3)$$

where $V_t$ is the initial amplitude of the voltage generated by the sample's FID signal where a delay t was used between rf pulses and $V_\infty$ is the upper limiting value of the FID signal generated voltage for a very long time period t between the 180° and 90° pulses. This equation is generally recast in a natural log form:

$$\ln (V_\infty - V_t) = \ln (2V_{28}) - t/T_1 \qquad (4)$$

where $-1/T_1$ is the slope of the curve generated by plotting $\ln (V_{28} - V_t)$ against t.

Several sequences of repeated rf energy pulses and FID signal voltage measurements were run with each sample for various t. In analyzing the sample response, FID signal components generated within about 45 microseconds of the midpoint of the second (90°) pulse were ignored as being a product of mineral (i.e. solid material) hydrogen. A semi-log plot of the relationship (4) was constructed from the measurement values. $T_1$ approaches a limiting value at the initial (smallest t) portion of the curve. If the semi-log curve generated by the data is nonlinear, as typically occurs because the water is bound in varying degrees to the sample formation rock and thus produce many different relaxation times, a standard curve fitting analysis can be performed by expressing the right side of the relationship (3), above, as a family of i curves:

$$\frac{V - V_t}{2V} = \sum_i f_i e^{-t/T_{1i}} \qquad (5)$$

The initial part of this curve (i.e. relationship (5)) decays in accordance with the relationship (3) where $1/T_1$ is now given by the relationship:

$$1/T_1 = \sum_i f_i/T_{1i} \qquad (6)$$

where the $T_{1i}$ are the different relaxation times and $f_i$ are weighting factors ranging between 0.0 and 1.0.

After the spin-lattice relaxation time $T_1$ is determined, the total surface area S in square meters of the water saturated rock sample is given by the relationship:

$$S/V_p = 1.84/T_1 \qquad (7)$$

where $V_p$ is the pore volume of the rock sample in cubic centimeters and is considered equal to the volume of the water added to the sample to achieve saturation. See D. O. Seevers "A Method of Determining Porosity by Means of a Pulsed NMR and an Application of the Method to the Study of a Gulf Coast Supernormally Pressure Well" presented at the Abnormal Subsurface Pressure Symposium of the Society of Petroleum Engineers of the A.I.M.E. held in Baton Rouge, La. May 15–16, 1972 incorporated by reference. The total surface area, S, divided by the weight of the dry sample is equal to the "Area$_{NMR}$" of the relationship (2), above.

It is believed that the NMR measuring technique is significantly more accurate than the nitrogen absorption technique which has typically been used by others in the field in attempting to correlate formation surface areas to irreducible water saturations, particularly where clays are present. Due to their internal interstitial surface areas, clays can increase the specific surface area of formation material greatly out of proportion to their volumetric contributions. It is believed that the nitrogen absorption technique fails to fully account for these internal surface areas.

Next, the irreducible water saturation for each formation rock sample is determined from a predefined relationship, preferably:

$$\log (1 - S_{wirr}) = C_1 \times A_{specific} - C_2 \qquad (8)$$

where $S_{wirr}$ is the fractional irreducible water saturation (i.e. ranging from 0.00 to 1.00 of the available pore space), $A_{specific}$ is the bulk volume specific surface area determined by the relationship (2), above, $C_1$ is the specific surface area coefficient and $C_2$ is the water saturation constant.

Figure 2:
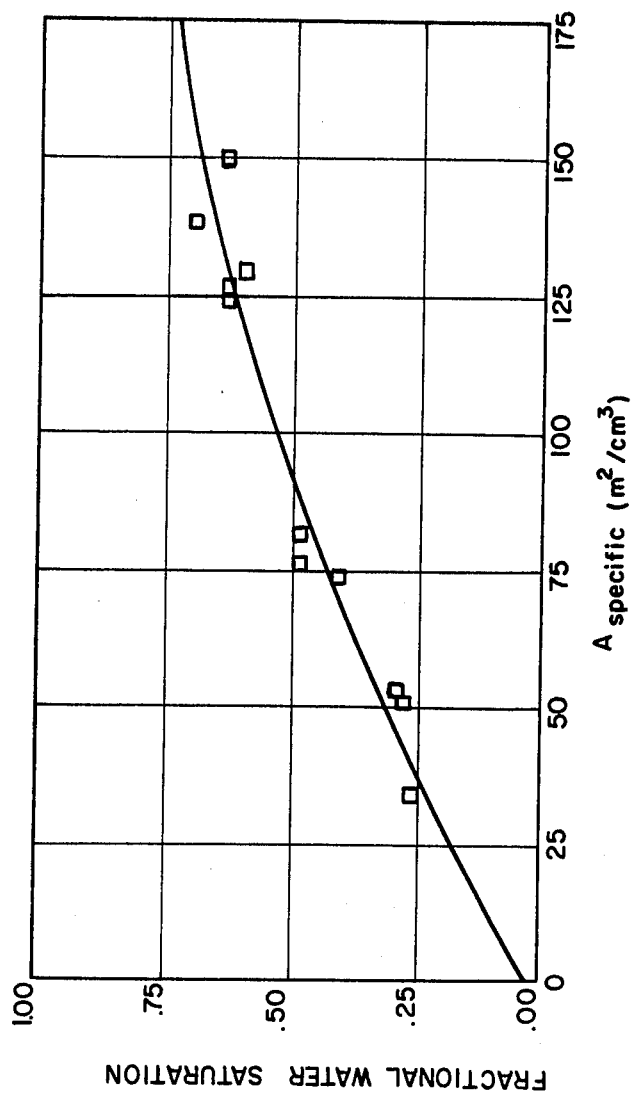
FIG. 2 depicts graphically, the relationship between irreducible water saturation and bulk volume specific surface area of geological formation rock.

The relationship (8) is depicted graphically in FIG. 2 with $C_1$ equal to $-0.00329$ and $C_2$ equal to 0.00435. These coefficient $C_1$ and constant $C_2$ values were determined from Pleistocene sediments in the Gulf of Mexico which typically produced induction resistivity log values less than about 1 ohm-meters (corresponding to water saturations of about 50 to 80% of the available pore space) and water-free hydrocarbons when tapped. Two, twenty foot rubber-sleeved cores were obtained through a borehole from a known, water-free hydrocarbon producing portion of the formation where induction resistivity log-indicated water saturation levels ranged from about 28% to more than 50% of the available pore space. The selected zone appeared to consist of a regressive-transgressive couplet whose origin is attributed to shallow water, deltaic sedimentation. One dozen samples were removed from the cores and subjected to a variety of inspections and tests. Microscopic examination indicated that the formation material appeared to be uniformly sized sand covered to varying degrees with smaller particles. The particles were separated from the sand in each of the samples by ultrasonic disaggregation and wet sieved to recover a less than 30 micron fraction. X-ray diffraction examination identified the coating materials to consist of about 25% shale and generally about 66% or more clay minerals. Smectite in mixed layered clay, illite and kaolinite/chlorite contributed about 30, 10 and 5%, respectively, to the less than 30 micron materials in most of the samples. The surface area per unit mass of the sample materials were measured by nuclear magnetic resonance in the manner previously described and the bulk volume specific surface area of each sample was thereafter determined according to the relationship (2), above. The matrix density was estimated to be 2.65 grams/cm.$^3$ and porosity was determined from density log measurements taken through the borehole with a Schlumberger compensated formation density logging tool. Bulk volume specific surface areas of the twelve samples were found to range from about 30 to 150 m$^2$/cm$^3$. An examination of the cores from which the samples were removed revealed that one sample has been taken from an identifiable zone only a few inches thick and was unrepresentative of the log data. That sample was ignored for purposes of correlating water saturation to surface area. Log-indicated water saturations for each of the remaining eleven samples were determined using the Archie relationship (1), above, with "n" equal to 1.84, "m" equal to 1.87, "a·R$_w$"=0.028 ohm-meters and were deemed to be irreducible from the fact that water free hydrocarbons were recovered from the zone from which the samples were obtained. Porosity was again determined from the aforesaid density log measurements. An optimum, least squares fit of the determined water saturation values and bulk volume specific surface areas of the remaining eleven samples generated the relationship (8) depicted in FIG. 2 (i.e. $C_1 = -0.00329$ and $C_2 = 0.00435$) with a correlation coefficient of about 0.98.

It is believed that specific surface area coefficient $C_1$ ($-0.00329$ for the eleven samples), will remain constant irrespective of the composition of the formation material being examined. However, it is expected that the specific surface area constant $C_2$ will vary (i.e., the curve depicted in FIG. 2 will rise or fall on the indicated scale) due to a variety of factors including, but not limited to, geopressure in the borehole, water and rock resistivities, salinity, formation temperatures, etc. In order to determine the location of the curve depicted in FIG. 2 for a particular geological formation, it is suggested that a rock sample be obtained from a known water-free hydrocarbon producing zone of the formation being investigated, either from the borehole under investigation or from another borehole in the vicinity, and the bulk volume specific surface area of this rock sample determined in the manner previously described. The relationship (8), above, is solved for $C_2$ where $C_1$ equals to $-0.00329$, $S_{wirr}$ equals to the water saturation $S_w$ as determined by Archie relation (1), above, from the log-indicated formation resistivity ($R_t$) at the point where the rock sample was obtained and $A_{specific}$ is the NMR determined bulk volume specific surface area of the sample. The determination of irreducible water saturation in this manner has the advantage over the Schlumberger nuclear magnetic log method in being more accurate because it measures $S_{wirr}$ directly. It has the added advantage of being applicable to many previously examined boreholes as porosity and water saturation are typically determined in a standard log analysis and core or other rock samples often gathered.

Next the irreducible water saturation, $S_{wirr}$, of a rock sample, determined from the relationship (8) above, is compared with the water saturation determined from the resistivity log measurements or other means at or about the point where the sample was obtained so that the greater of the two values is ascertained. Where the irreducible water saturation approximates or exceeds the formation water saturation, any mobile hydrocarbons at that level of the formation may be expected to be water-free or substantially water free (i.e. have a low water cut). One manner to accomplish this comparison is to simply compare the determined value of the irreducible water saturation with that of the formation water saturation, the latter typically being provided in a plot.

FIG. 3 illustrates a perhaps more useful manner in which this can be done. In FIG. 3, fractional formation water saturation determined from a formation resistivity log is represented by the wavy line 30 and is plotted in a typical log format as a function of depth of the formation. The water saturation 30 ranges linearly from 0.0 at the bottom to 1.00 (i.e. 0% to 100% of the pore space of the formation) at the top of the graph. Irreducible water saturation determined from a core sample obtained at about the "B" level is represented by the point 31 and has a value of about 0.75. A broken line 32, has been drawn along this 0.75 fractional water saturation level to either side and through the point 31. Water saturation 30 drops from about 0.90 or more to less than about 0.75 at the depth level "A" and rises again above 0.75 at the depth level "C". The irreducible water saturation 31 determined from the core sample equals or exceeds the formation water saturation 30 at the depth marked "B" where the rock sample was obtained, so it is expected that any mobile hydrocarbons located at the "B" level would be water-free or have only a low water cut. The extent of the low water cut zone about the level B can be roughly determined by the lines 30 and 32. The area 33 indicated by shading and formed by the line 30 dropping beneath the line 32 identifies the thickness of a zone (i.e. ranging between the depths "A" and "C") in which the water is essentially or entirely immobile, assuming that the lithology of the formation does not vary over that zone from that represented by the sample rock.

Alternatively a computer may be programmed to compare values and to generate and identify on a plot those zones where irreducible water saturation approximates or exceeds the formation water saturation or to simply provide a listing identifying those zones. Where several rock samples are obtained in sequence, it is envisioned that the line 32 may also be replaced with a wavy line like the formation water saturation line 30 tracking the determined irreducible water saturations from rock sample point to rock sample point through the formation or the portion of the formation from which the samples where obtained. This is illustrated in FIG. 4 where log-determined water saturation represented by a solid line 40 has been plotted as a function of depth with irreducible water saturation, represented by the broken line 42. The latter approximates or exceeds the former over the indicated depth except between the pairs of levels marked D and D', E and E', F and F' and G and G' from which a high attendant water production should be expected if tapped.

Having described specific embodiments of the present invention, it will be understood that further modifications throughout may be suggested to those skilled in the art, and it intended to cover all such modifications as fall within the scope of the appended claims.

What is claimed:

1. A method for identifying potential low water cut hydrocarbon reservoirs in a geological formation having significant water saturation comprising the steps of:
   traversing a length of a borehole through said formation with a logging tool;
   generating with said logging tool during said traversing step a first set of signals representing the formation water saturation;
   determining from said first set of signals, the water saturation of the formation along said length;
   sampling the formation rock at a level at which water saturation is significant;
   measuring the surface area of the sampled formation rock by nuclear magnetic resonance;
   determining the irreducible water saturation at said level of the formation from the measured surface area of the sampled formation rock; and
   plotting the irreducible water saturation and the log determined water saturation of the formation at said level to produce a log which can be compared to identify a level at which said irreducible water saturation approximates or exceeds the corresponding log determined water saturation as a potential region where hydrocarbons may be produced without significant attendant water production.

2. The method of claim 1 wherein said step of plotting further comprises:
   plotting the log determined water saturation at levels about said level at which the formation rock was sampled; and said method further comprises the step of:
identifying those zones wherein irreducible water saturation approximates or exceeds the log determined water saturation as potential regions wherein hydrocarbons may be produced without significant water production.

3. The method of claim 1 wherein said step of measuring the surface area of the formation sample comprises the steps of:
generating a magnetic field about a wetted sample of the formation material;
irradiating the sample with a first pulse of radio frequency energy during said generating step;
irradiating the sample with a second pulse of radio frequency energy at a time t after said first irradiating step and during said generating step;
detecting a signal generated by the sample after said second irradiating step and during said generating step;
repeating said irradiating and detecting steps for a plurality of different times t during said generating step; and
determining from said detected signals the surface area of the formation sample.

4. The method of claim 1 wherein said step of measuring the surface area of the formation sample comprises the steps of:
wetting the formation sample with water;
generating a magnetic field in the vicinity of the wetted sample of the formation material whereby hydrogen nuclei of water molecules within the sample assume a preferred orientation with respect to the field;
irradiating the sample with a first pulse of radio frequency energy to excite hydrogen nuclei of the water molecules therein;
irradiating the sample with a second pulse of radio frequency energy at time t after said first irradiating step to again excite the hydrogen nuclei water molecules;
detecting a free induction decay signal generated by the hydrogen nuclei of the water molecules;
repeating said irradiating and detecting steps for a plurality of different times t; and
determining from said free induction decay signals the surface area of the formation sample.

5. The method of claim 4 wherein said step of detecting further comprises detecting that portion of the free induction decay signal generated by hydrogen nuclei of water molecules bound to the formation material surfaces.

6. The method of claim 4 wherein said detecting steps further comprise detecting the free induction decay signal generated more than 45 microseconds after the second pulse of radio frequency energy.

7. The method of claim 4 wherein said irradiated radio frequency energy is about 25 megahertz.

8. The method of claim 4 further comprising before said wetting step the step of:
cleansing the formation material sample of hydrocarbons; and
said wetting step further comprises;
saturating the formation sample with brine having salinity equal to that of the water in the formation from which the sample was obtained.

9. The method of claim 1 wherein said first set of signals comprises a formation resistivity log.

* * * * *